(12) United States Patent
Abe

(10) Patent No.: US 6,468,068 B1
(45) Date of Patent: Oct. 22, 2002

(54) RESIN SEAL RING DIE WITH VARIOUS MOLD CUT PORTIONS

(75) Inventor: Yoshiyuki Abe, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/153,235

(22) Filed: Sep. 15, 1998

Related U.S. Application Data

(62) Division of application No. 08/691,815, filed on Jul. 31, 1996, now Pat. No. 5,865,443.

(30) Foreign Application Priority Data

Aug. 4, 1995 (GB) .............................. 7-218287

(51) Int. Cl.[7] .............................. B22C 9/22; B29C 45/17
(52) U.S. Cl. ................. 425/553; 249/57; 425/DIG. 42; 425/DIG. 47; 425/542
(58) Field of Search ................... 425/DIG. 47, DIG. 42, 425/553, 542; 277/448, 496; 264/235, 154, 328.12, 328.9; 249/57

(56) References Cited

U.S. PATENT DOCUMENTS

| | | | | |
|---|---|---|---|---|
| 118,169 A | * | 8/1871 | Tinsley | 249/57 |
| 433,879 A | * | 8/1890 | Sullivan | 264/57 |
| 1,563,189 A | * | 11/1925 | Hausherr | 164/238 |
| 3,427,801 A | * | 2/1969 | McLeish | 59/1 |
| 3,764,646 A | * | 10/1973 | Hach | 264/241 |
| 4,277,434 A | * | 7/1981 | Conway | 264/297 |
| 4,299,401 A | * | 11/1981 | McCormick | 277/216 |
| 4,432,925 A | * | 2/1984 | Holtzberg et al. | 277/216 |
| 4,668,209 A | * | 5/1987 | Kyoosei et al. | 474/190 |
| 4,747,602 A | * | 5/1988 | Kobayashi et al. | 277/216 |
| 5,087,057 A | * | 2/1992 | Kurkowski | 277/216 |
| 5,131,666 A | * | 7/1992 | Hutchens | 277/216 |
| 5,164,134 A | * | 11/1992 | Durand | 264/154 |
| 5,225,136 A | * | 7/1993 | Furugohri et al. | 264/328.8 |
| 5,275,400 A | * | 1/1994 | Rehfeld | 277/216 |
| 5,275,422 A | * | 1/1994 | Rehfeld | 277/144 |
| 5,303,936 A | * | 4/1994 | Kuroki | 277/165 |
| 5,380,018 A | * | 1/1995 | Mader et al. | 277/216 |
| 5,507,502 A | * | 4/1996 | Dennison, Jr. | 277/117 |
| 5,628,519 A | * | 5/1997 | Kakehi | 277/216 |
| 5,833,913 A | * | 11/1998 | Ellwood et al. | 264/328.7 |
| 5,955,022 A | * | 9/1999 | Walker et al. | 264/400 |

FOREIGN PATENT DOCUMENTS

| | | | | |
|---|---|---|---|---|
| FR | 2629549 | * | 10/1989 | 277/216 |
| FR | 2677100 | * | 12/1992 | 277/216 |
| GB | 589003 | * | 3/1945 | |
| SU | 1592618 | * | 9/1990 | 277/216 |

* cited by examiner

Primary Examiner—Jan H. Silbaugh
Assistant Examiner—Emmanuel S. Luk
(74) Attorney, Agent, or Firm—Jacobson Holman, PLLC

(57) ABSTRACT

In the manufacture of a seal ring having a cut portion at one position on the circumference by injecting a molten molding material from a gate into a cavity of a forming die, the gate is provided at a position apart from the opposite position to the cut portion of the seal ring. In the case of a seal ring with a weld portion, the weld portion is set away from the cut portion.

3 Claims, 5 Drawing Sheets

RESIN SEAL RING DIE WITH VARIOUS MOLD CUT PORTIONS

This is a divisional of application Ser. No. 08/691,815 filed Jul. 31, 1996, now U.S. Pat. No. 5,865,443.

BACKGROUND OF THE INVENTION

The present invention generally relates to a seal ring, a method of manufacturing the same, and a forming die of the same and more particularly relates to a seal ring used for sealing a portion where hydraulic control of automatic transmissions of AT motorcars and the like is required, a method of manufacturing the same, and a forming die of the same.

FIG. 1 shows a conventional seal ring having a cut portion 2 at one place on its circumference.

A conventional injection molding die for forming such a seal ring is shown in FIG. 2. A molten molding material is pressed under high pressure into a cavity 4a through a gate 3 of a forming die 4A and then it is hardened by cooling or heating. In this case, if the flow length of the molten molding material in the cavity 4a within the forming die is too long, it sometimes occurs that the molding material is not completely filled into the cavity 4a of the forming die. Also, it sometimes occurs that the molding material begins to harden before it fully flows into the cavity 4a of the forming die. In such cases, the molding material is not fully filled in the die and, hence, a work of exactly the same form as the die cannot be produced. Such phenomena are called "short in a moulding" and "sink mark".

Therefore, to make the flow length of the molding material within the cavity 4a of the forming die as small as possible, it was practiced to provide the gate 3 at the portion opposite to the mold gap cut portion 12. More particularly, the mold gap cut portion 12 and the gate 3 were located along the direction of the diameter 20 of the circular cavity 4a as shown in FIG. 2.

When the seal ring 1 is loaded in place, the mold gap cut portion 12 is widened to the left and to the right. At that time, a maximum strain is generated at the opposite portion 15 to the mold gap cut portion 12.

When the gate 3 is provided at the position opposite to (the other side across the diameter of) the mold gap cut portion 12 of the forming die 4A, the seal ring 1 produced by such an arrangement has a lower strength. The reason is that the portion corresponding to the gate 3, i.e., the portion 13-corresponding-to-gate 3, has somewhat lowered strength compared with other portions of the seal ring 1. As a result, in the case where a material exhibiting smaller elongation is used as the material for the seal ring 1, it tends to break when it is loaded in place because the opposite portion 15 to the mold gap cut portion 2 of the seal ring 1 coincides with the portion 13-corresponding-to-gate 3.

Further, a seal ring 1 can be molded by the use of a forming die 4B having no cut portion (continuous circle) as shown in FIG. 3. In this case, the seal ring 1 is cut at the position corresponding to the gate 3 and thus the continuous circle cut portion 2 is provided. Namely, the portion-corresponding-to-gate becomes the continuous circle cut portion. In the case of FIG. 3, the flows of the molding material divided into two directions through the cavity 4b at the gate 3 form the so-called weld portion 14 at the position where they meet each other. Since the weld portion 14 does not provide a perfect bond, it has somewhat lowered strength as compared with other portions. Therefore, if a weld portion 14 is formed at the opposite portion 15 to the continuous circle cut portion 2, the continuous circle cut portion 2 is widened when the seal ring is loaded in place, and the opposite portion 15 to the continuous circle cut portion 2 comes to be damaged, especially for a material exhibiting small elongation.

On the other hand, generally, seal rings are molded out of molding materials with PEEK used as the base. PEEK is a hard resin having a high melting point. Therefore, moldings formed of such a PEEK-based forming material are hard and brittle. It is difficult to make a cut with a knife in a PEEK seal ring after it has been molded. If it is forcibly cut, there arises a possibility of breaking it.

Therefore, PEEK seal rings are molded by injecting the molding material into the cavity 4a of a forming die 4A having a mold gap cut portion 12 previously provided as shown in FIG. 2. Otherwise, PEEK seal rings 1 in a cavity 4c are molded by the use of a forming die 4c partly joined at the continuous circle cut portion 2 as shown in FIG. 4A and FIG. 4B, and the portion 2a enclosed with broken lines is cut off by using a milling machine in a subsequent working process.

Further, the PEEK-based forming material is less fluid at the time of injection. Therefore, troubles of short shot are liable to occur when the flow length is too long or the flow passage area is too small.

SUMMARY OF THE INVENTION

An object of the present invention is to provide a seal ring improved in loadability by having its strength improved, a method of manufacturing the seal ring, and a forming die for use in the manufacturing method of the seal ring.

In the present invention, improvements are made on the position of the gate through which a molding material is injected into the cavity of a forming die and the position of the cut portion in the seal ring.

In one preferred mode of the present invention, when a cut portion is provided at one position on the circumference of the cavity of a forming die, the opposite portion to the cut portion of the seal ring is set away from the position corresponding to the gate of the forming die. More particularly, the cut portion and the portion-corresponding-to-gate are not located along the direction of a diameter of the seal ring. Thereby, at the time when the seal ring is loaded in place, stress is prevented from concentrating in the portion-corresponding-to-gate of the seal ring having inferior strength. As a result, the seal ring becomes less breakable when the cut portion is widened.

In another mode of the invention, when no cut portion is provided on the circumference of the cavity of a forming die, the cut portion of the seal ring is formed apart from the positions of both the weld portion and the portion-corresponding-to-gate. For example, the opposite portion to the cut portion where stress concentrates when the cut portion of the seal ring is widened is placed away from the position of the gate. Thereby, at the time when the seal ring is loaded in place, stress is prevented from concentrating in the portion-corresponding-to-gate and the weld portion which are inferior in strength. As a result, the seal ring becomes less breakable even when the cut portion is widened.

BRIEF DESCRIPTION OF THE DRAWINGS

The embodiments of the invention will be described with reference to the drawings, in which.

DESCRIPTION OF THE PREFERRED EMBODIMENTS

In the present invention, kinds of the molding materials are not particularly limited. As representative ones of generally used molding materials, that having polyether ether keton (hereinafter called PEEK) as its base and that having tetrafluoroethylene-perfluoroalkylvinylether copolymer (hereinafter called PFA) as it s base can be used. These materials are selected in terms of properties to be considered when the position of the portion-corresponding-to-gate of the seal ring is determined.

EXAMPLE 1

Example 1 of the invention is an example for molding a seal ring out of a PEEK-based molding material.

PEEK is a resin being hard and having a high melting point. Seal ring moldings formed of the PEEK-based material is hard and brittle.

The PEEK-based molding material is less fluid when injected into a die and, therefore, troubles of short shot are liable to occur when the flow length is too long or the flow passage area is too small.

Although, in Example 1 of the invention, a seal ring is molded out of the PEEK-based material, such drawbacks with the use of the PEEK-based material are removed.

First, a manufacturing method of a seal ring of such a small diameter as 30 mm or so in outer diameter will be described.

Figure 5:
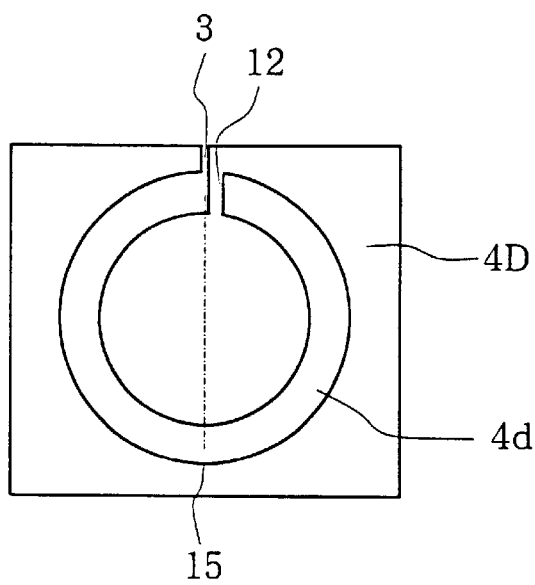
FIG. 5 is a diagram schematically showing a structure of a forming die for manufacturing a seal ring according to a preferred embodiment of the invention.

As shown in FIG. 5, the cavity 4d of a forming die 4D for manufacturing such a small-diametered seal ring has a relatively short flow length. Therefore, it is possible to mold the seal ring by the use of a forming die 4D in which the gate 3 is provided adjacent to the mold gap cut portion 12 of the forming die 4D. In this case, as apparent from FIG. 5, the gate 3 and the mold gap portion 12 are located extremely apart from the opposite position to them across the diameter of the circular cavity 4d. More particularly, the gate 3 is provided at a position far apart from the opposite portion 15 to the mold gap cut portion 12.

Now, a manufacturing method of a seal ring having an outer diameter of 30 mm or more will be described.

The cavity 4e of a forming die 4E for manufacturing a seal ring of such a large outer diameter has a long flow length. Therefore, it is difficult to provide the gate 3 adjacent to the mold gap cut portion 12 as in the example shown in FIG. 5.

Figure 6:
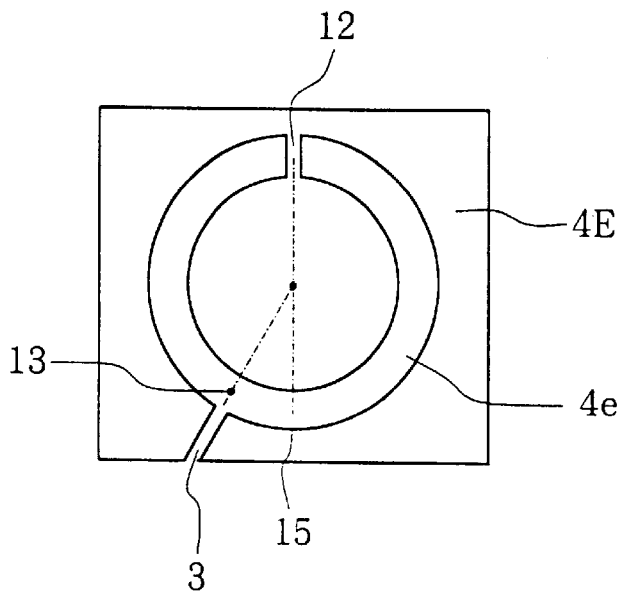
FIG. 6 is a diagram schematically showing a structure of another forming die for manufacturing a seal ring according to an embodiment of the invention.
Figure 7:
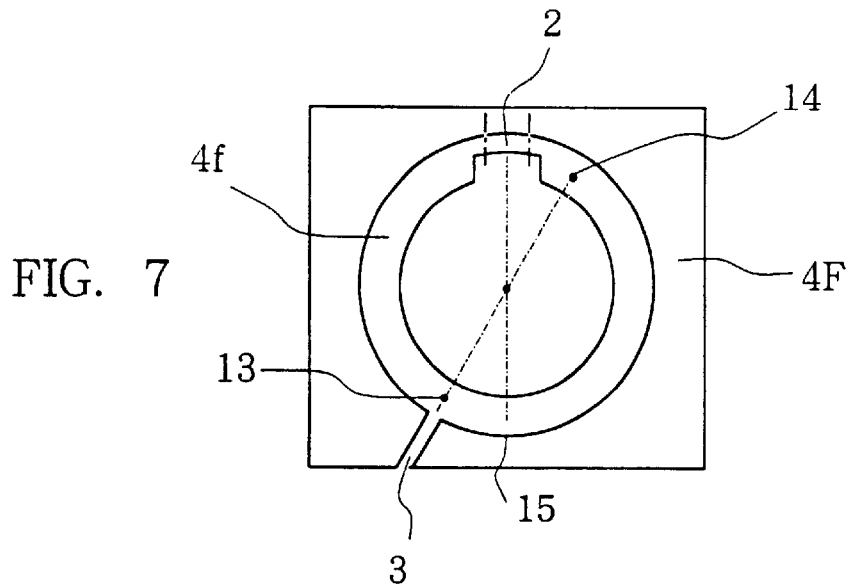
FIG. 7 is a diagram schematically showing a structure of a further forming die having a continuous circle cavity for manufacturing a seal ring according to an embodiment of the invention.

Therefore, in the cases of forming dies 4E and 4F, as shown in FIG. 6 and FIG. 7, the gate 3 is provided at a position other than the portion adjacent to the mold gap cut portion 12 or the continuous circle cut portion 2, respectively, and the opposite portion 15 to the mold gap cut portion 12 or continuous circle cut portion 2. The gate 3 and the cut portions 2 and 12 are apart from the opposite positions thereto across the diameter of the circular cavities 4e and 4f, and the gate 3 is provided at a position apart from the opposite portion 15 to the cut portions 2 and 12.

In the case of the forming die 4E shown in FIG. 6, the outer diameter of the cavity 4e is 30–100 mm and the gate 3 is located at an angle of approximately 90–150 degrees from the mold gap cut portion 12. Short shot due to such a displacement of the gate can be removed by adjusting the injection pressure and injection speed of the molding material. In the case where the flow length is too long or the flow lengths are extremely unbalanced, it sometimes occurs that the molding material is not filled fully into the die even if the injection pressure and injection speed are changed. Therefore, it is preferred that the gate 3 is located so that the flow lengths become balanced as much as possible. When the diameter of the cavity is 52–65 mm, for example, it is preferred that the gate 3 is set at an angle of approximately 90–135 degrees from the mold gap cut portion 12.

Figure 1:
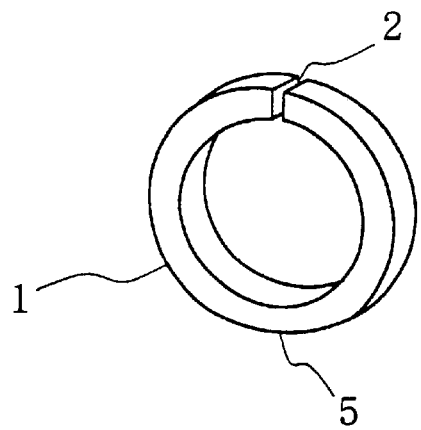
FIG. 1 is a perspective view showing a conventional seal ring having one cut portion.
Figure 2:
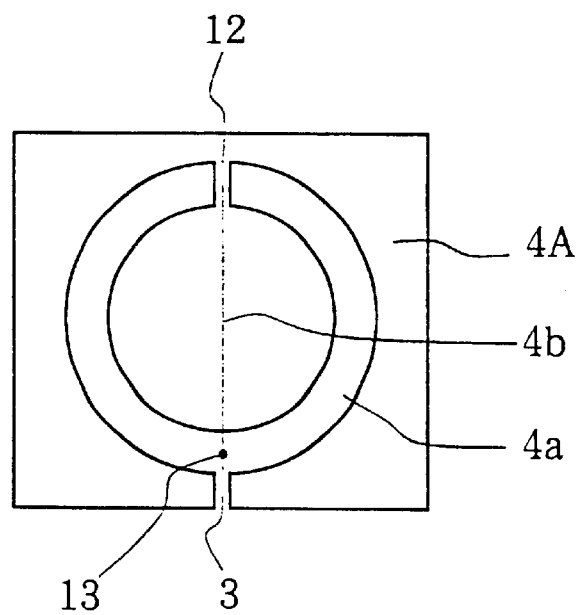
FIG. 2 is a diagram schematically showing a structure of a forming die for manufacturing the conventional seal ring shown in FIG. 1.
Figure 3:
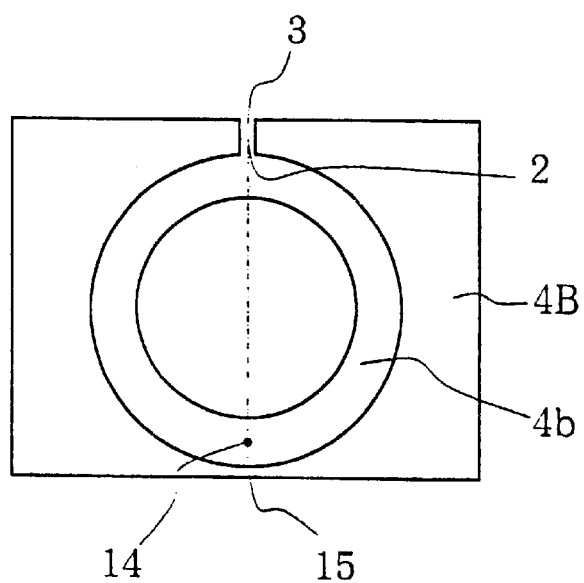
FIG. 3 is a diagram schematically showing a structure of a forming die for manufacturing the conventional seal ring shown in FIG. 1.
Figure 4A:
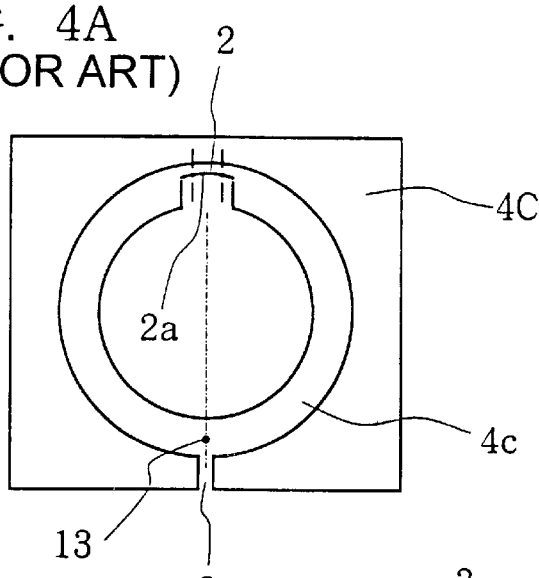
FIG. 4A is a diagram schematically showing a structure of a forming die for manufacturing a conventional seal ring.
Figure 4B:
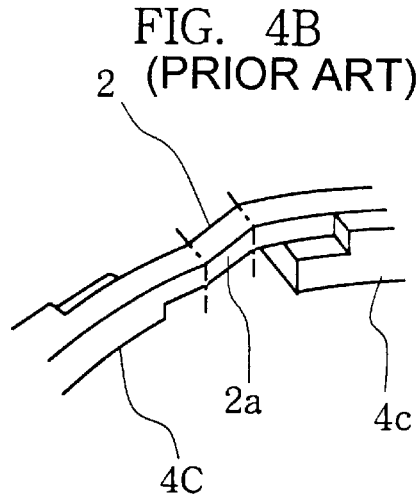
FIG. 4B is an enlarged view showing the cut portion and its vicinity of the forming die of FIG. 4A.

The structure in the vicinity of the continuous circle cut portion 2 in FIG. 7 is virtually the same as that shown in FIG. 4B.

In the forming die 4F shown in FIG. 7, no mold gap cut portion is provided in the forming die 4F. Hence, there is no need of considering the balancing of the flow lengths. The two flows of the molten material divided into two directions through the circular cavity 4f at the gate 3 meet each other virtually at the position opposing the gate 3. The weld portion 14 is formed at the meeting position. The diameter of the cavity 4f is approximately 52 mm and the gate 3 is positioned at an angle of approximately 135 degrees form the continuous circle cut portion 2. The position of the gate 3 is set so that not only the gate 3 is apart from the opposite portion 15 to the continuous circle cut portion 2 but also the weld portion 14 is formed at a portion apart from the opposite portion 15 to the continuous circle cut portion 2. When the diameter of the cavity 4f is 52–65 mm, for example, it is preferred that the position of the gate 3 is set at an angle of approximately 90–135 degrees from the continuous circle cut portion 2.

In the case where molding is performed with the use of such a forming die with a previously formed mold gap cut portion 12 as the forming die 4D of FIG. 5 and the forming die 4E of FIG. 6, two flows of the molding material injected from the gate 3 will not meet each other and, hence, no weld portion is produced.

A method for setting a preferred gate position in molding a seal ring with the use of the forming die 4E shown in FIG. 6 will be described concretely.

Figures 8A, 8B:
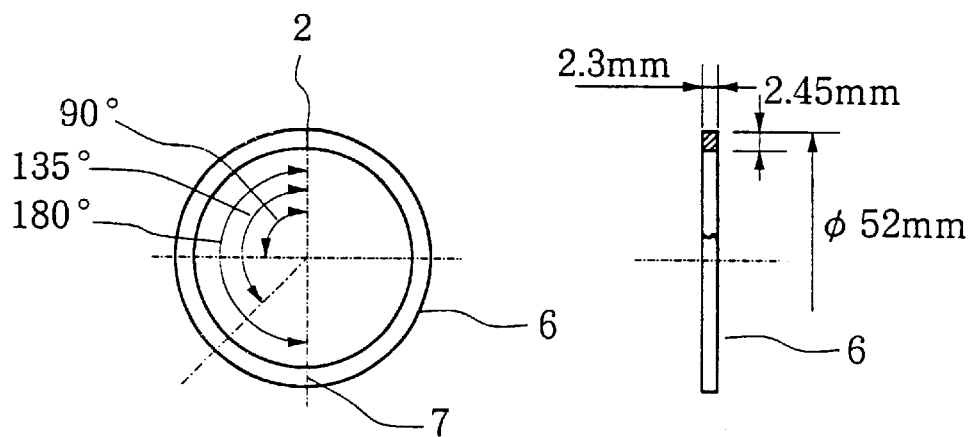
FIG. 8A is a front view showing a seal ring according to an embodiment of the invention.
FIG. 8B is a partially broken out side view of the seal ring shown in FIG. 8A.
Figure 9:
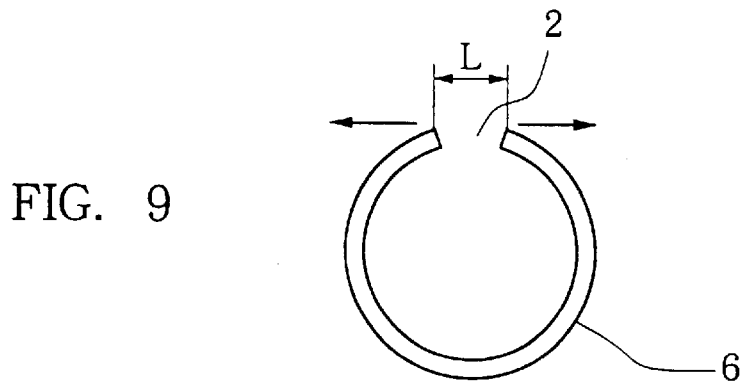
FIG. 9 is a diagram showing the extended length of the cut portion of the seal ring shown in FIG. 8A.

FIG. 8A and FIG. 8B show an example of a seal ring 6 being 52 mm in outer diameter, 2.3 mm in width, and 2.45 mm in thickness. Experiments were conducted on the seal ring 6 shown in FIG. 8A and FIG. 8B with the gate position in the molding die 4E of FIG. 6 changed in various ways. When the position of the gate 3 relative to the mold gap cut portion 12 was changed to 90 degrees, 135 degrees, and 180 degrees, the allowable extended length L of the cut portion (FIG. 9) varied as shown in the graph of FIG. 10.

Figure 10:
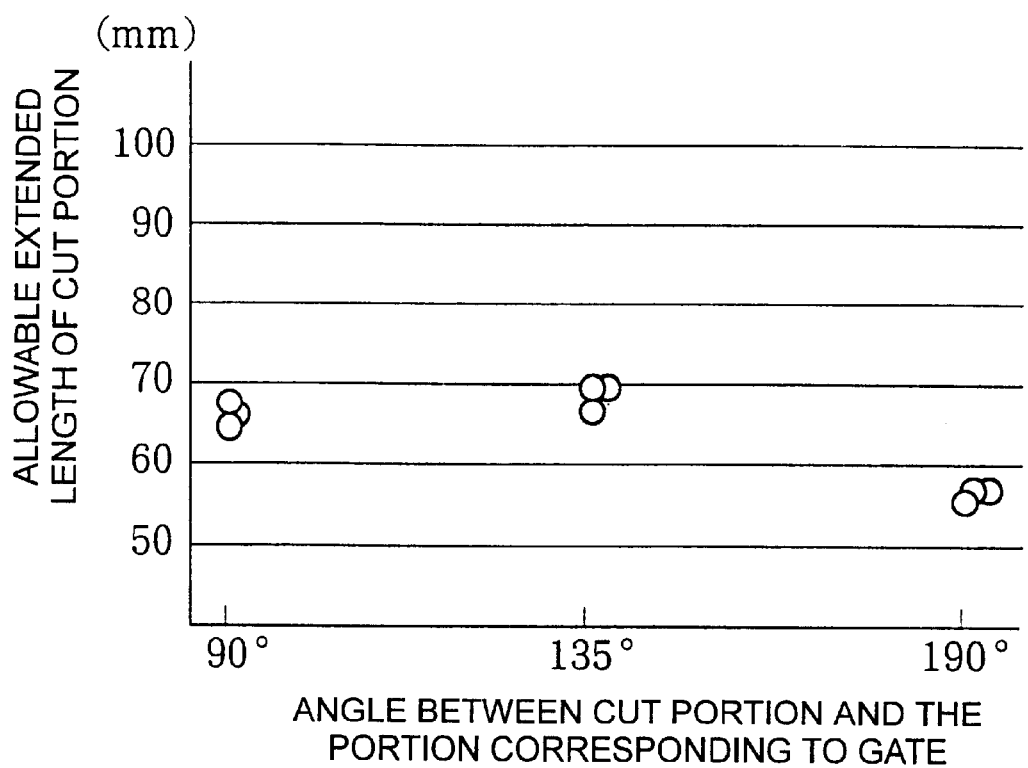
FIG. 10 is a graph showing the relationship between the position of the portion-corresponding-to-gate relative to the cut portion (i.e., the angle between the cut portion and the portion-corresponding-to-gate) of the seal ring shown in FIG. 8A and the allowable extended length of the cut portion of the seal ring.

According to the graph of FIG. 10, although no sharp changes in the allowable extended length L of the mold gap cut portion 12 are observed, it is known that the allowable extended length L of the mold gap cut portion 12 obtained when the gate 3 is placed away from the opposite portion 15 to the mold gap cut portion 12 is larger than that obtained when the gate 3 is placed at the opposite portion to the cut portion (at 180 degrees therefrom) and the strength is correspondingly improved.

In this case, if the gate 3 is placed to far away from the opposite portion 15 to the mold gap cut portion 12, the flow lengths become unbalanced and a short shot becomes liable to occur. Therefore, it is preferred that the gate 3 is set at a position forming an angle of approximately 135 degrees with the mold gap cut portion 12.

Also when a seal ring is formed by the use of the forming die 4F of FIG. 7, widening of the continuous circle cut portion 2 of the seal ring 6 produces stress concentration at the opposite portion 7 to the continuous circle cut portion 2. Therefore, the position of the gate 3 is set according to the above described method.

Also when a seal ring 6 has a larger outer diameter, a seal ring improved in strength and loadability can be produced by similarly setting the gate 3 at another portion than the opposite portion 15 to the continuous circle cut portion 2.

EXAMPLE 2

Example 2 of the invention is an example in which a seal ring is molded out of a PFA-based molding material.

PFA has a high melting point and is softer than PEEK. However, PFA is a resin having fragility due to weak molecular bond. Therefore, if the gate is set at the portion opposite to the cut portion, a seal ring formed of the PFA-based molding material is liable to break at the opposite portion to the cut portion when the cut portion is widened.

In the case of Example 2, the gate is provided at a portion other than the opposite portion to the cut portion.

Since the seal ring molding formed of the PFA-based material is soft, it is possible to make a cut therein with a knife after it has been molded.

Seal ring moldings formed of the PFA-base material can be molded by injecting the molten material into the cavity 4e of a forming die 4E having a mold gap cut portion 12 as shown in FIG. 6.

Figure 11:
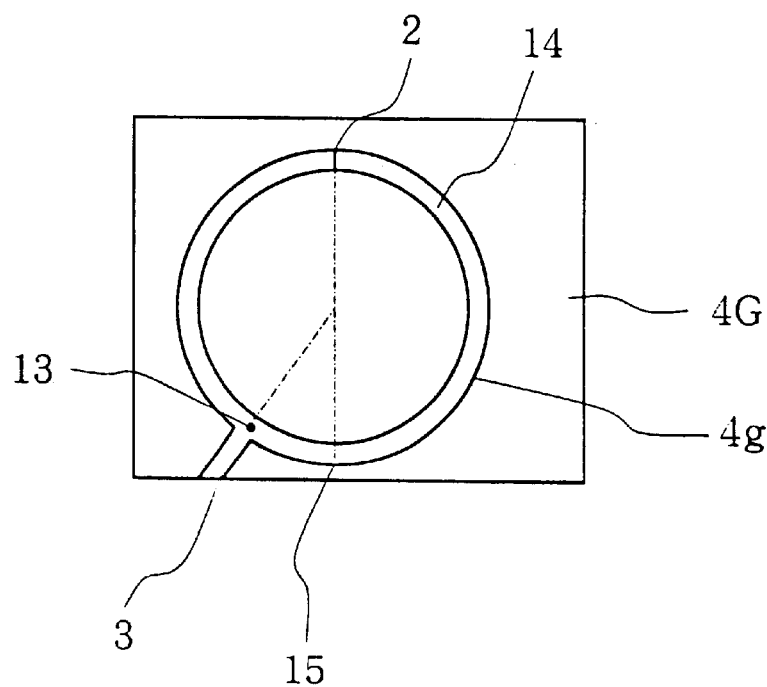
FIG. 11 is a diagram schematically showing a structure of a forming die for manufacturing a seal ring according to another embodiment of the invention.

It is also possible to produce seal ring 4g products formed of the PFA-based material by forming the seal ring by the use of a forming die 4G joined at the mold gap cut portion 12 (or having no cut portion; continuous circle) as shown in FIG. 11 and, after the forming, by cutting the continuous circle cut portion 2 at the position indicated by the broken line.

In the case wherein the seal ring 4g is molded by the use of the forming die 4G of FIG. 11, a weld portion 14 is formed in the seal ring at the position virtually opposing the gate 3. The weld portion 14, as well as the portion 13-corresponding-to-gate 3, has inferior strength as compared with other portions, and therefore, the position of the gate 3 is set such that the weld portion 14 and the portion-corresponding-to-gate 3 are located at positions other than the opposite portion 15 to the continuous circle cut portion 2.

Figure 12A:
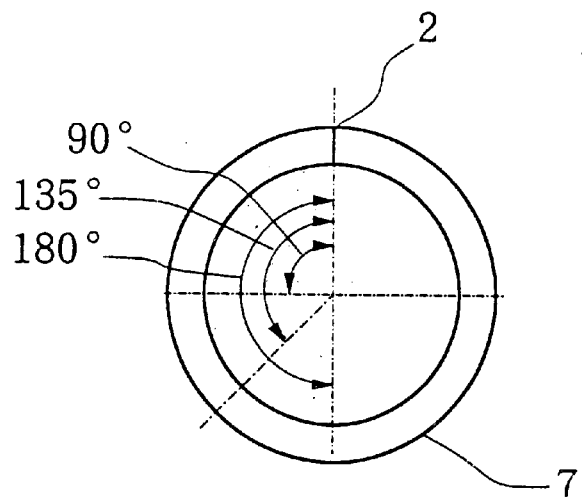
FIG. 12A is a front view showing an example of seal rings manufactured by the use of the forming die of FIG. 11.
Figure 12B:
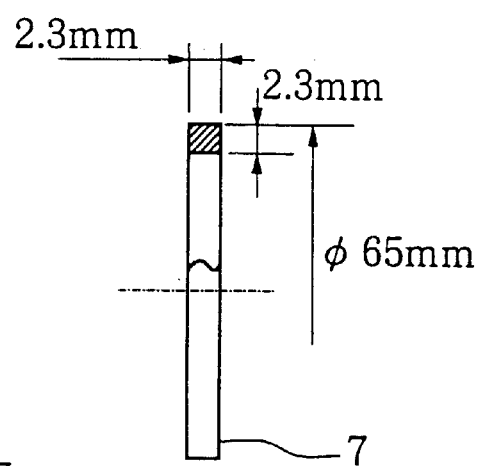
FIG. 12B is a partially broken out side view of the seal ring shown in FIG. 12A.

A method for setting the gate position in the manufacture of a seal ring 7 being 65 mm in outer diameter, 2.3 mm in width, and 2.3 mm in thickness as shown in FIG. 12A and FIG. 12B will be described.

Experiments were conducted on the seal ring 7 shown in FIG. 12A and FIG. 12B with the gate position 3 of the forming die 4G shown in FIG. 11 changed in various ways. When the position of the portion 13-corresponding-to-gate 3 relative to the continuous circle cut portion 2 of the seal ring 7 is changed, the allowable extended length L of the continuous circle portion 2 (FIG. 5) of the seal ring 7 exhibited variations as shown in the graph of FIG. 13.

In the case, since the forming die 4G used has no cut portion (continuous circle), the problem of unbalanced flow lengths does not occur. However, the flow length becomes greater according as the outer diameter becomes larger, and therefore, it is preferable to adjust the injection pressure and injection speed of the molding material to avoid the trouble of short shot.

Figure 13:
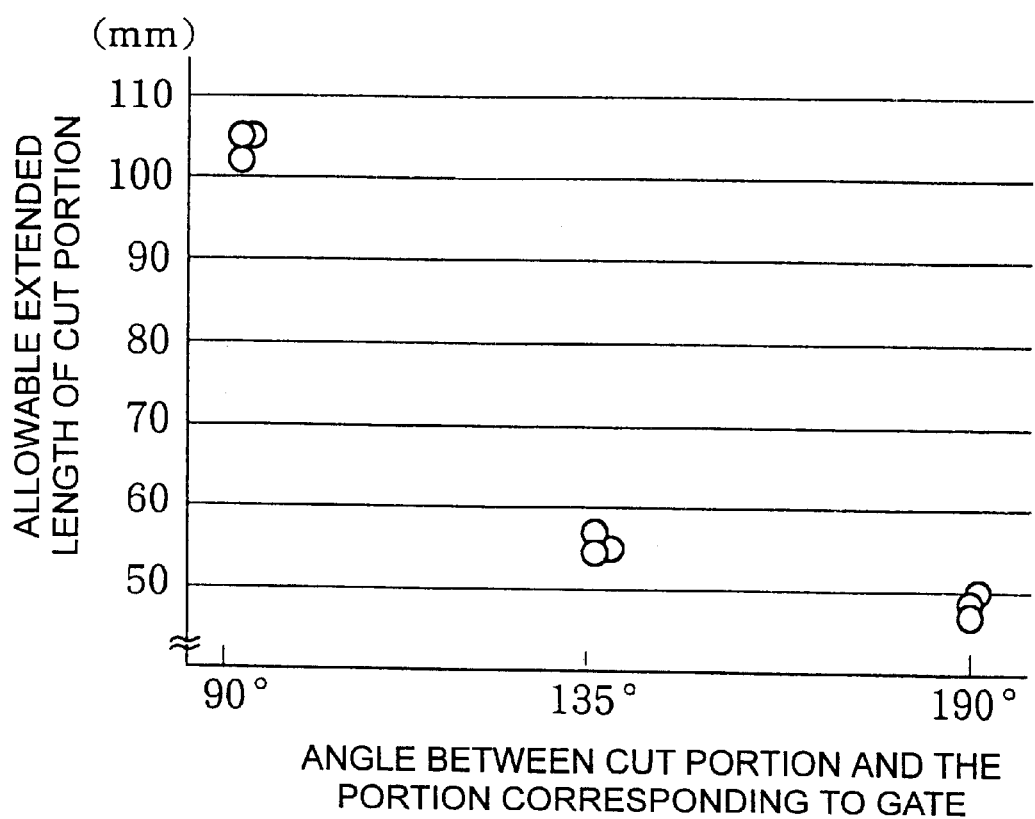
FIG. 13 is a graph showing the relationship between the position of the portion-corresponding-to-gate relative to the cut portion (i.e., the angle between the cut portion and the portion-corresponding-to-gate) of the seal ring shown in FIG. 12A and the allowable extended length of the cut portion of the seal ring.

Referring to the graph of FIG. 13, it is known that the allowable extended length of the continuous circle cut portion 2 is the largest when the gate 3 of the forming die 4G is provided at a position 90 degrees apart from the continuous circle cut portion 2. The allowable extended length of the continuous circle cut portion 2 becomes the smallest when the gate 3 is provided at a position of the opposite portion 15 to the continuous circle cut portion 2, namely, at a position 180 degrees apart from the continuous circle cut portion 2. Since the weld portion 14 is formed at a position virtually opposing the position of the gate 3, the weld portion 14 comes to be produced closer to the opposite portion 15 to the continuous circle cut portion 2 as the angle formed between the continuous circle cut portion 2 and the gate 3 becomes smaller than 90 degrees. As a result, a strength similar to that obtained when the portion 13-corresponding-to-gate 3 is set closer to the opposite portion 15 to the continuous circle cut portion 2 is obtained.

Accordingly, in this case, the strength becomes the highest when the portion 13-corresponding-to-gate 3 is set in a position 90 degrees apart from the continuous circle cut portion 2. Hence, it is preferable to set the portion 13-corresponding-to-gate 3 at this position. Thus, the strength of the seal ring is improved by setting the position of the gate 3 such that the portion 13-corresponding-to-gate 3 and the weld portion 16 are formed at positions other than the opposite portion 15 to the continuous circle cut portion 2. Further, the breakage of the opposite portion 15 to the continuous circle cut portion 2 occurring when the seal ring is loaded in place can be prevented and its loadability can be improved.

Variations

While an example for a PEEK-based material and an example for a PFA-based material were described above, the invention is not limited to these.

The range in which the gate 3 should be provided for the forming die depends on the flow length, flow passage area, and viscosity of the material. Even when a different shape from the above is produced or a different material from the above is used, the strength and loadability of the seal ring can be improved by providing the gate 3 at a position other than the opposite portion 15 to the continuous circle cut portion 2 after investigation of the shape and material.

The shape of the continuous circle cut portion 2 is not limited to those mentioned in the Examples 1 and 2. A bias cut, a stepped cut, and the like are also possible.

What is claimed is:

1. An injection molding apparatus having a die for manufacturing a resin seal ring having a cut portion which is to be cut by a cutter after the resin seal ring is removed from said die, said injection molding apparatus comprising:

means for defining a cavity, means for defining a gate connected to said cavity for injecting a molten molding resin material into said cavity therethrough, said cavity being formed in a completely continuous circle, said gate being located at a position spaced apart at an angular displacement along the circumference of said cavity from an opposite portion to said cut portion, said opposite portion being at 180 degrees from said cut portion, across a diameter of said cavity, means for forming a weld portion in said seal ring at a position where two flows of said molten molding resin material meet each other within said cavity when said resin material flows into said cavity from said gate, means for forming said cut portion of said seal ring as a narrowed section of a completely continuous circle through which said resin material can flow toward said weld portion, so that no end and no gap are formed in said cavity, said weld portion being located at a position spaced apart from said narrowed section of said cut portion.

2. The injection molding apparatus as defined in claim 1, wherein said means for forming said cut portion of said seal ring includes means for forming said narrowed section of said cut portion by means of a protruding portion of said die, which protrudes into said cavity.

3. The injection molding apparatus as defined in claim 1, wherein said gate is positioned at an angle of 90 to 135 degrees from said cut portion of said seal ring.

* * * * *